(12) United States Patent
Clark

(10) Patent No.: US 7,578,044 B2
(45) Date of Patent: Aug. 25, 2009

(54) COORDINATION HOLE APPARATUS AND METHODS OF USE

(75) Inventor: Gregory L. Clark, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 11/256,134

(22) Filed: Oct. 21, 2005

(65) Prior Publication Data

US 2007/0102578 A1     May 10, 2007

(51) Int. Cl.
B25B 27/14     (2006.01)
(52) U.S. Cl. .................. 29/525.02; 29/281.5; 29/897.2; 29/407.1; 408/76
(58) Field of Classification Search ............... 29/897.2, 29/281.1, 407.09, 407.1, 525.01, 525.02, 29/525.06, 524.1, 798, 281.5; 408/76, 115 R, 408/72 R
See application file for complete search history.

(56) References Cited

U.S. PATENT DOCUMENTS

| | | | |
|---|---|---|---|
| 3,381,554 A | 5/1968 | Ploch | |
| 3,918,694 A | 11/1975 | Laudick | |
| 4,244,109 A | 1/1981 | Silverman | |
| 4,538,355 A | 9/1985 | Morghen | |
| 4,805,316 A | 2/1989 | Curti | |
| 5,050,288 A * | 9/1991 | Woods | 29/407.1 |
| 6,357,101 B1 * | 3/2002 | Sarh et al. | 29/407.09 |
| 6,796,014 B2 * | 9/2004 | Sarh | 29/407.09 |
| 2005/0125979 A1 * | 6/2005 | Chen | 29/281.1 |
| 2005/0147477 A1 * | 7/2005 | Clark | 408/76 |

OTHER PUBLICATIONS

Stephen Harry Werst, Pinned Interfaces, Chapter 24, 29 pages, Dallas, Texas.
www.carrlane.com, pages downloaded Jul. 14, 2005 and Aug. 18, 2005, 6 pages, St. Louis, Missouri.

* cited by examiner

*Primary Examiner*—David P Bryant
*Assistant Examiner*—Ryan J Walters
(74) *Attorney, Agent, or Firm*—Rozenblat IP LLC

(57) ABSTRACT

Apparatus and methods for use are disclosed for coordinating a hole of one part with a hole of another part. The apparatus may include a base member, a pin member defined by a slot having a first length in one direction which is greater than a second length in a second direction, and an index member extending beyond an end of the base member. The index member may be adapted to position the first length of the slot in a position parallel to a datum of a part being joined by the apparatus. During operation, a portion of the pin member may be inserted in a hole of one part. The slot may be at least partially aligned with a second, smaller hole in another part.

9 Claims, 11 Drawing Sheets

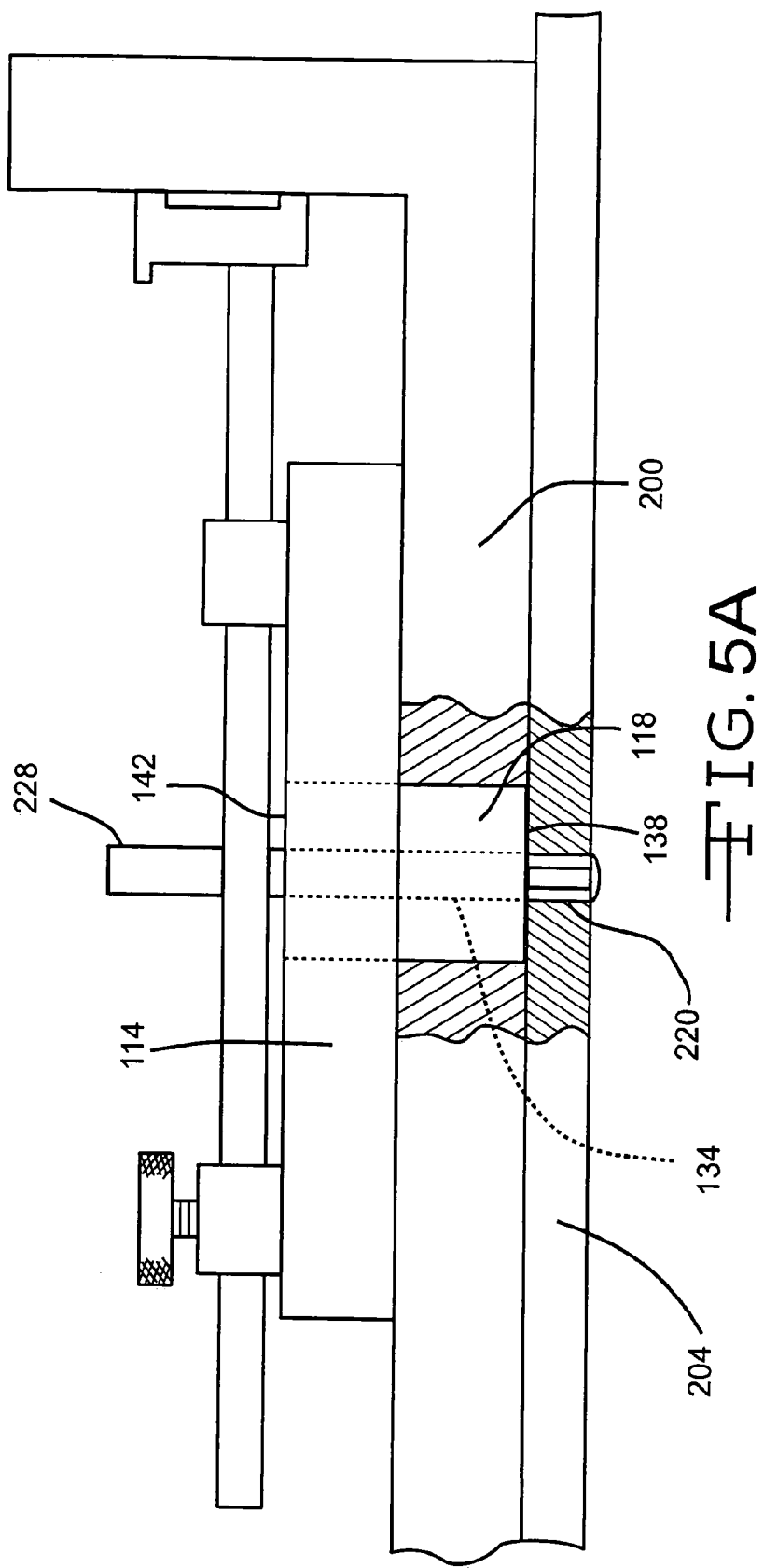

COORDINATION HOLE APPARATUS AND METHODS OF USE

BACKGROUND

Coordination hole drilling is a method where parts are located into assemblies using precision holes predrilled in each part. Typically, these holes are a small subset of the total number of holes, are undersized holes for coordinating purposes, and are subsequently drilled to full size after the part is at least partially fastened. Expensive and inflexible tooling may be avoided utilizing this process. However, coordination hole drilling can be expensive and difficult to achieve on long parts, and also on contoured parts where the contours do not match. Mismatch between holes of the parts being joined may be caused by several factors including; machining errors, fixturing errors when the part is machined, temperature of fabrication and differential temperature growth of parts to be joined, riveting, contour mismatch, and hole angularity, especially on thick parts. Long parts are sensitive to differential temperature growth where the assembly temperature may affect the hole to hole fit-up. A typical use of coordination holes to locate one flexible part to another requires that the holes pin up precisely. However, as the parts become longer the location of the holes along the length typically become less certain and this mismatch in holes also reduces the accuracy of locating the parts relative to desired datums. The difficulty of aligning and pinning these holes is also increased due to this mismatch. Slotting one or more of the parts being assembled may allow for hole mismatch while keeping the datums of the parts under control. However, slotting the parts being assembled is time consuming, difficult to install, expensive, and difficult to size up at assembly. Typically, the final holes need to be round to accept standard fasteners and reduce stress concentrations.

Coordination hole apparatus and methods of use are needed which may allow parts to be assembled, while maintaining a datum of one or more of the parts, even when holes are mismatched along the lengths of the parts.

SUMMARY

In one aspect of the invention, an apparatus is disclosed for joining a plurality of parts. The apparatus comprises a base member, a pin member, and an index member. The pin member is defined by a slot having a first length in one direction which is greater than a second length in a second direction. The index member extends at least partially beyond an end of the base member, and is adapted to position the first length of the slot in a position substantially parallel to a datum of a part being joined by the apparatus.

In another aspect of the invention, a method is disclosed to at least partially align a hole of one part with a hole of another part. A first part is provided having at least one first hole, and a second part is provided having at least one second hole smaller than the first hole. An apparatus is provided which includes a base member, a pin member, and an index member. The pin member is defined by a slot having a first length in one direction which is greater than a second length in a second direction. The index member extends from the base member. At least a portion of the pin member is inserted in the first hole. The slot is aligned, at least partially, with the second hole.

In yet another aspect of the invention, an assembly comprises a first part having at least one first hole, and a second part having at least one second hole smaller than the first hole. The first hole is at least partially aligned with the second hole. The first and second holes were at least partially aligned utilizing an apparatus comprising a base member, a pin member, and an index member. The pin member is defined by a slot having a first length in one direction which is greater than a second length in a second direction. The index member at least partially extends beyond an end of the base member.

The present invention, together with further objects and advantages, will be best understood by reference to the following detailed description taken in conjunction with the accompanying drawings.

BRIEF DESCRIPTION OF SEVERAL VIEWS OF THE DRAWINGS

FIG. 5A is a partial cross-sectional side view taken along line 5A of FIG. 5 showing a fastener in place;

DETAILED DESCRIPTION OF THE PREFERRED EMBODIMENTS

The following description of preferred embodiments provides examples of the present invention. The embodiments discussed herein are merely exemplary in nature, and are not intended to limit the scope of the invention in any manner. Rather, the description of these preferred embodiments serves to enable a person of ordinary skill in the art to use the present invention.

The present invention generally pertains to apparatus and methods for locating one part to one or more parts. It may provide improved methods of using coordinating holes where the accuracy of assemblies is greater and the reliance on high tolerance holes are reduced. It may further allow for the coordinating holes to have additional tolerance substantially parallel to a part's datum.

Figure 1:
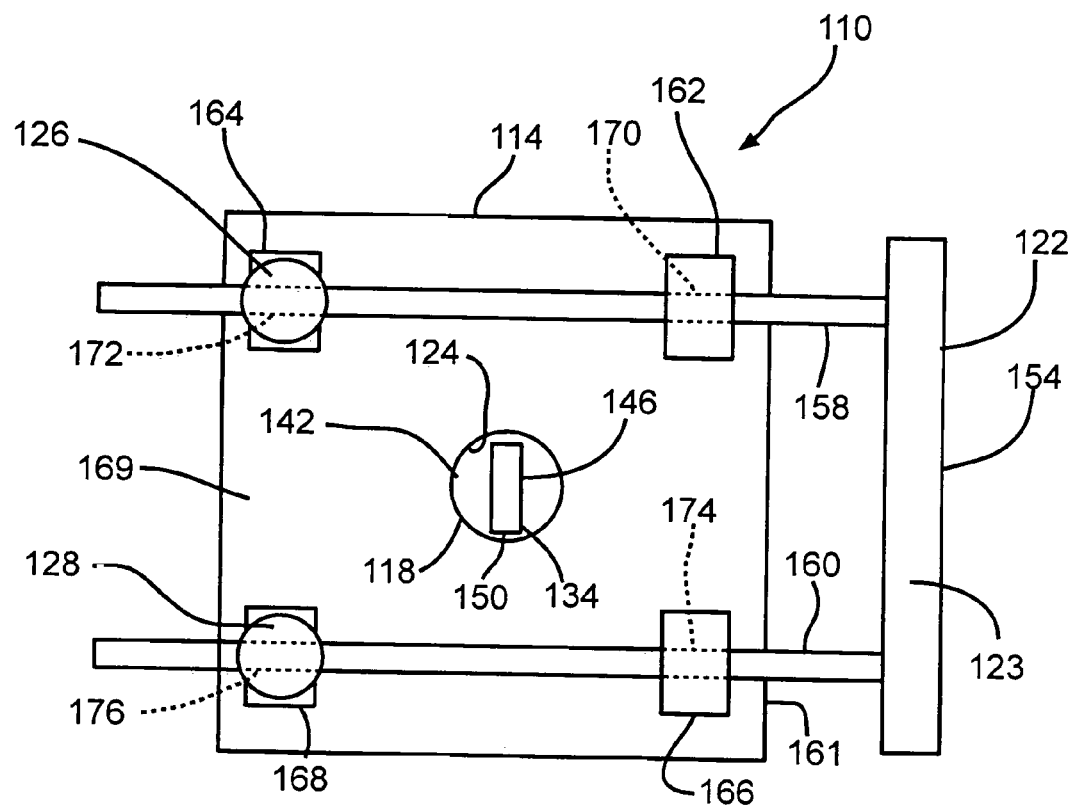
FIG. 1 is a top view of one embodiment of a coordination hole apparatus of the present invention.
Figure 1A:
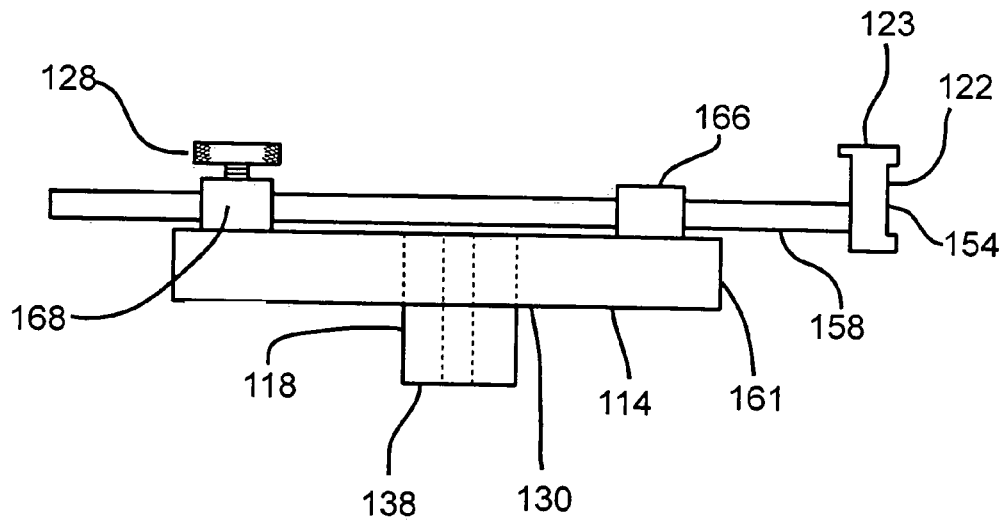
FIG. 1A is a side view of the apparatus of FIG. 1.

FIGS. 1 and 1A depict one embodiment of a coordination hole apparatus 110 of the present invention. The coordination hole apparatus 110 comprises a base member 114, a pin member 118, an index member 122, and locking members 126 and 128. The base member 114 is a rectangular plate made of steel. The pin member 118 is generally cylindrical and extends through a hole 124 in the base member 114 and past a surface 130 of the base member 114. The pin member 118 may be made of steel or other materials known in the art. The pin member 118 is connected in a fixed, substantially perpendicular position relative to the base member 114. A generally rectangular slot 134 extends from a top surface 142 of the pin member 118 through a bottom surface 138 of the pin member 118. One side 146 of the generally rectangular slot 134 is longer than a second side 150 of the slot 134. In other embodiments, the pin member 118 may be integral to the base member 114, may be connected to a surface of the base member 114 as a separate part, and/or may be rotateable relative to the base member.

The index member 122 comprises a steel index plate 154 and two generally cylindrical, arms 158 and 160 attached to and extending substantially perpendicular to the index plate 154. The index plate 154 is generally parallel to the long side 146 of the slot 134, and is adapted to extend beyond an end 161 of the base member 114. Generally rectangular boss members 162, 164, 166, and 168 are connected to a top surface 169 of the base member 114. Arm 158 extends through apertures 170 and 172 in boss members 162 and 164. Similarly, arm 160 extends through apertures 174 and 176 in boss members 166 and 168. Arms 158 and 160 are adapted to slide relative to boss members 162, 164, 166 and 168 in order to adjust the position of the index plate 154 relative to the base member 114. Locking members 126 and 128 comprise screws extending through holes (not shown) in the boss members 164 and 168 and are adapted to lock and unlock the index member 122 in place relative to the base member 114 when the locking members 126 and 128 are rotated in alternative directions. The index member 122 can be removed, flipped over, and repositioned in order to locate surface 123 at or below base member 114. The index member 122 may be located to allow it to index relative to a part being assembled.

In other embodiments, the coordination hole apparatus 110, including base member 114, pin member 118, index member 122, locking members 126 and 128, slot 134, and boss members 162, 164, 166, and 168, may be of varying quantity, size, shape, location, configuration, orientation, and material.

Figure 2:
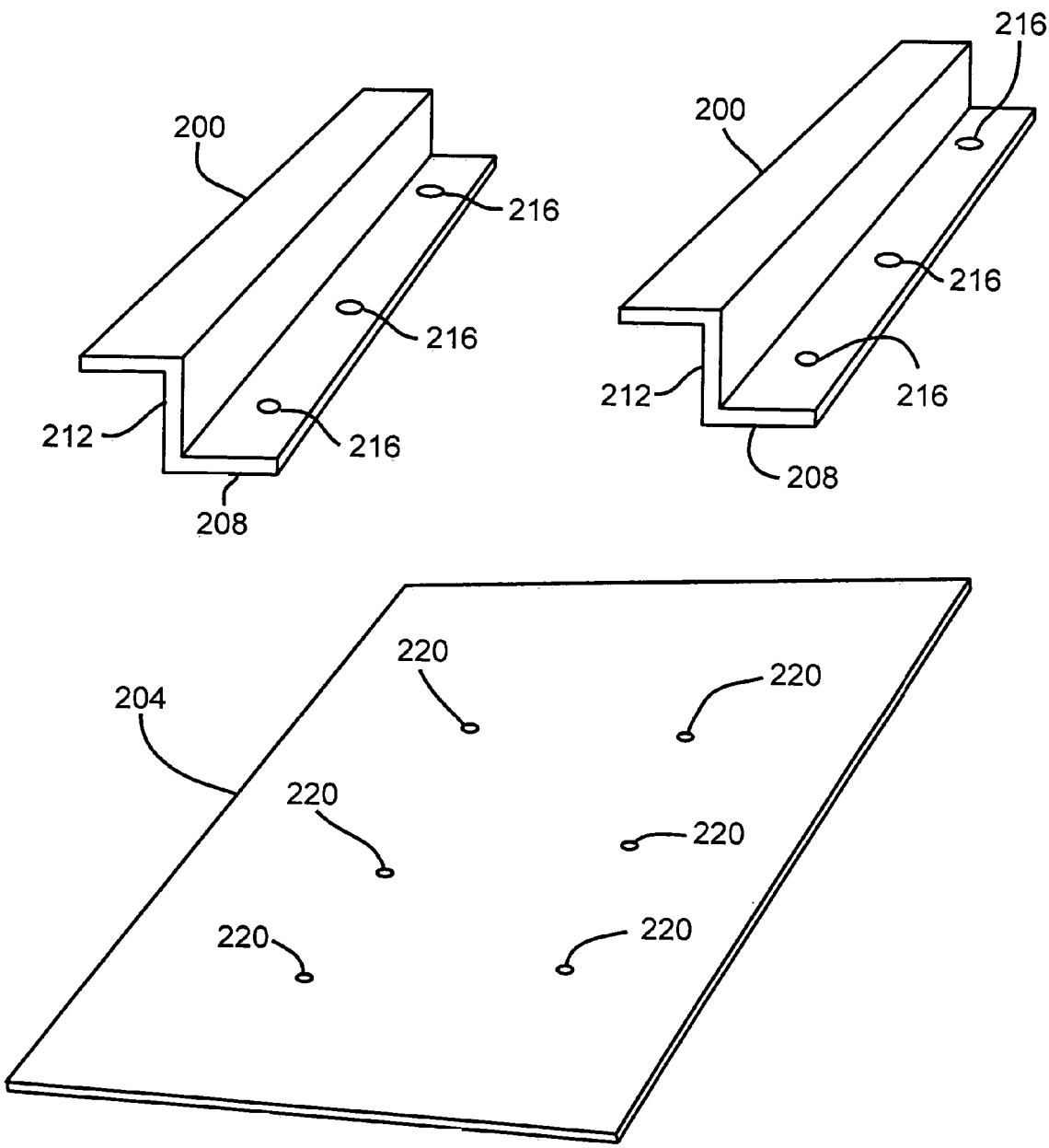
FIG. 2 is a perspective view of two airplane wing stringers being placed over an airplane wing skin prior to utilizing the apparatus of FIG. 1.
Figure 3:
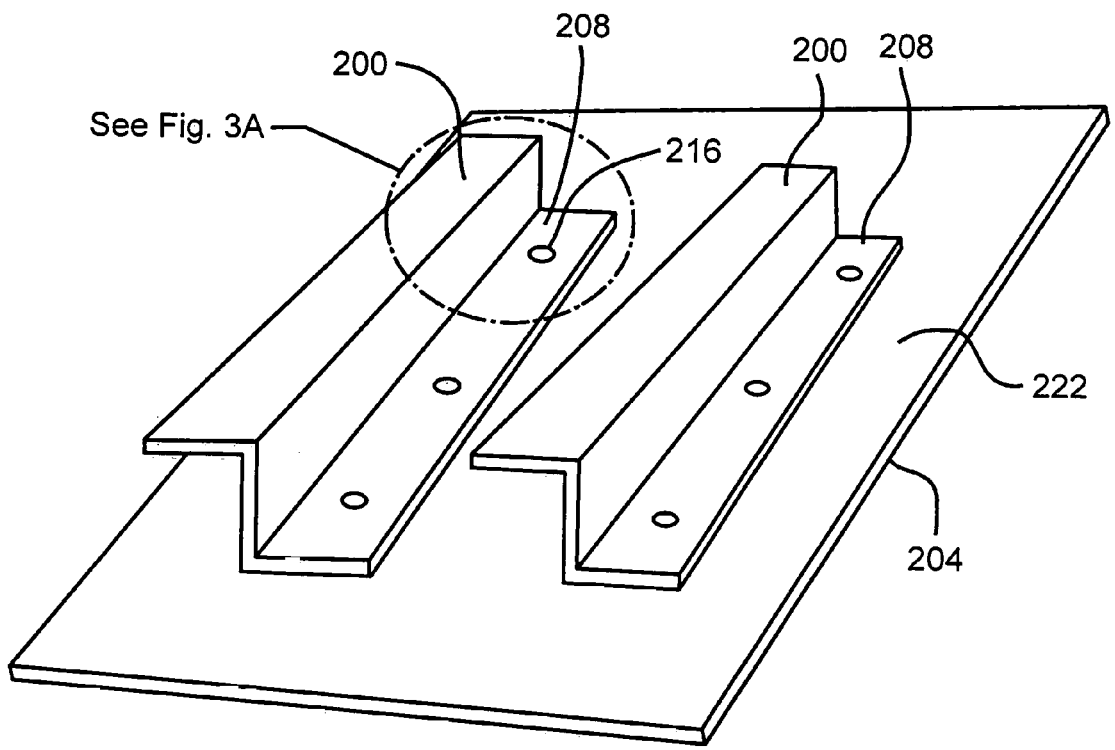
FIG. 3 is a perspective view of the airplane stringers of FIG. 2 being abutted against the airplane wing skin prior to utilizing the apparatus of FIG. 1.
Figure 3A:
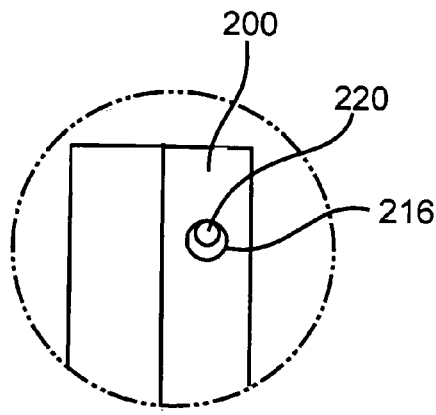
FIG. 3A is a partial top view taken around circle 3A of FIG. 3 showing a hole of the stringer being partially aligned with a hole of the wing skin prior to utilizing the apparatus of FIG. 1.

FIGS. 2-5 depict various stages of a method of using the coordination hole apparatus 110 of FIG. 1 to join wing stringers 200 with a wing skin 204 during the assembly of an airplane. As shown in FIG. 2, the wing stringers 200 are placed over the wing skin 204. The wing stringers 200 comprise a horizontal surface 208 and a vertical surface 212. Full-sized or near full-sized holes 216 extend through various portions of the horizontal surface 208 in the wing stringers 200. Smaller pilot holes 220 extend through portions of the wing skin 204. As depicted in FIG. 3, the horizontal surface 208 of the wing stringers 200 is abutted against a top surface 222 of the wing skin 204. As shown in FIG. 3A, which is a partial top view taken around circle 3A of FIG. 3, one or more of the full-sized holes 216 in the wing stringers 200 is at least partially aligned with one or more of the smaller pilot holes 220 in the wing skin 204.

Figure 4:
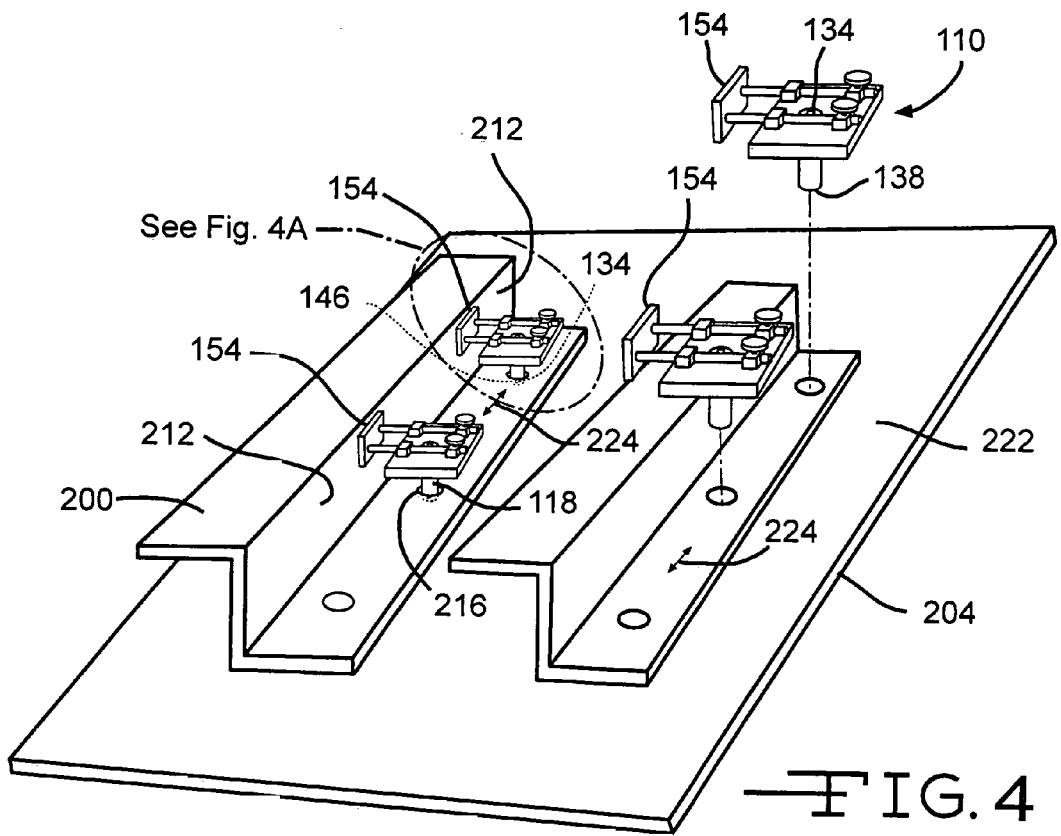
FIG. 4 is a perspective view of the apparatus of FIG. 1 being used to locate the holes of the stringers and wing skin of FIGS. 3 and 3A.
Figure 4A:
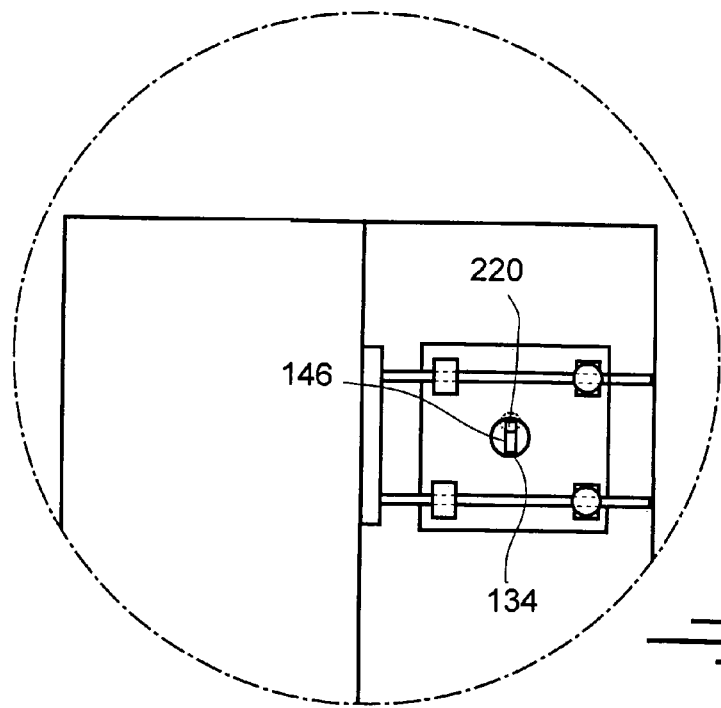
FIG. 4A is a partial top view taken around circle 4A of FIG. 4 showing the slot of the apparatus being at least partially aligned with the holes of the stringer and wing skin.

As shown in FIG. 4, the index plate 154 of the coordination hole apparatus 110 is abutted against the vertical surface 212 of the wing stringers 200 and the pin member 118 of the coordination hole apparatus 110 is inserted into a full-sized hole 216 of the wing stringers 200. It should be noted that the pin member 118 is smaller than the full-sized holes 216 in the wing stringers 200, but larger than the pilot holes 220 in the wing skin 204. As shown in FIGS. 4 and 4A, which is a partial top view around circle 4A of FIG. 4, the bottom surface 138 of the pin member 118 is abutted against a portion of the top surface 222 of the wing skin 204. A portion of the rectangular slot 134 is aligned over one of the pilot holes 220 in the wing skin 204. Due to the parallel alignment of the long side 146 of the rectangular slot 134 with both the index plate 154 and the vertical surface 212 of the wing stringers 200, the long side 146 of the slot 134 is kept in a position parallel to a datum 224, consisting of a critical dimensioning direction, in one or more of the wing stringers 200 and wing skin 204. As a result, the coordination hole apparatus 110 may be slid and adjusted along the vertical surface 212 of the wing stringers 200, to orient the slot 134 over one of the pilot holes 220 in the wing skin 204, while maintaining the long side 146 of the slot parallel to the datum 224.

Figure 5:
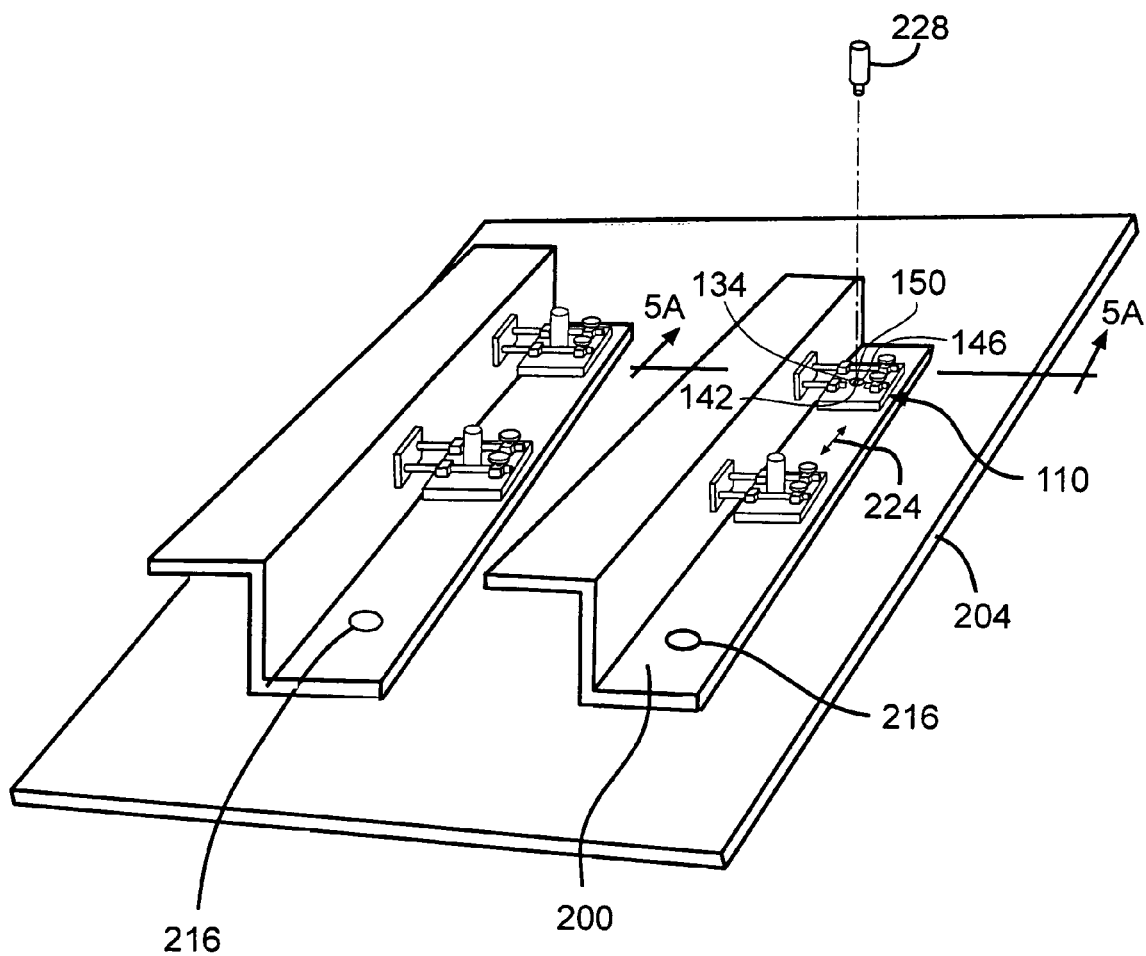
FIG. 5 is a perspective view of fasteners being placed in the slots of the apparatus shown in FIGS. 4 and 4A in order to fasten the stringers to the wing skin.

As depicted in FIGS. 5 and 5A, a fastener 228 is inserted into the slot 134 at the top surface 142 of the pin member 118. The fastener 228 is extended through a cross-section of the pin member 118, a cross-section of the base member 114, and a cross-section of the wing stringer 200. The fastener 228 is extended out of the slot 134 in the bottom surface 138 of the pin member 118, and extended through the pilot hole 220 in the wing skin 204. The short side 150 of the rectangular slot 134 prevents the fastener 228 from deviating from a position substantially parallel to the datum 224, while the long side 146 of the rectangular slot 134 allows for the fastener 228 to be adjusted along the datum 224 to allow for easier insertion. The fastener 228 is used to secure the stringer 200 to the wing skin 204. The fastener 228 may comprise any fastener known in the art, and may utilize any type of fastening mechanism, such as an expansion mechanism. Multiple coordination hole apparatus 110 may be used to secure all of the full-sized holes 216 in the stringer 200 with the pilot holes 220 in the wing skin 204 in order to secure the stringer 200 to the wing skin 204. The coordination hole apparatus 110 may be removed with the fasteners 228 in place. Fasteners installed between coordination holes, or other mechanisms known in the art, may be used to secure the stringers 200 and wing skin 204 in place, prior to the fasteners 228 being removed. The full-sized holes 216 and pilot holes 220 may be further drilled to a pre-determined dimension. Bolts or other securing mechanisms known in the art may be inserted into the full-sized holes 216 and pilot holes 220 to permanently secure the stringers 200 to the wing skin 204.

Figure 6:
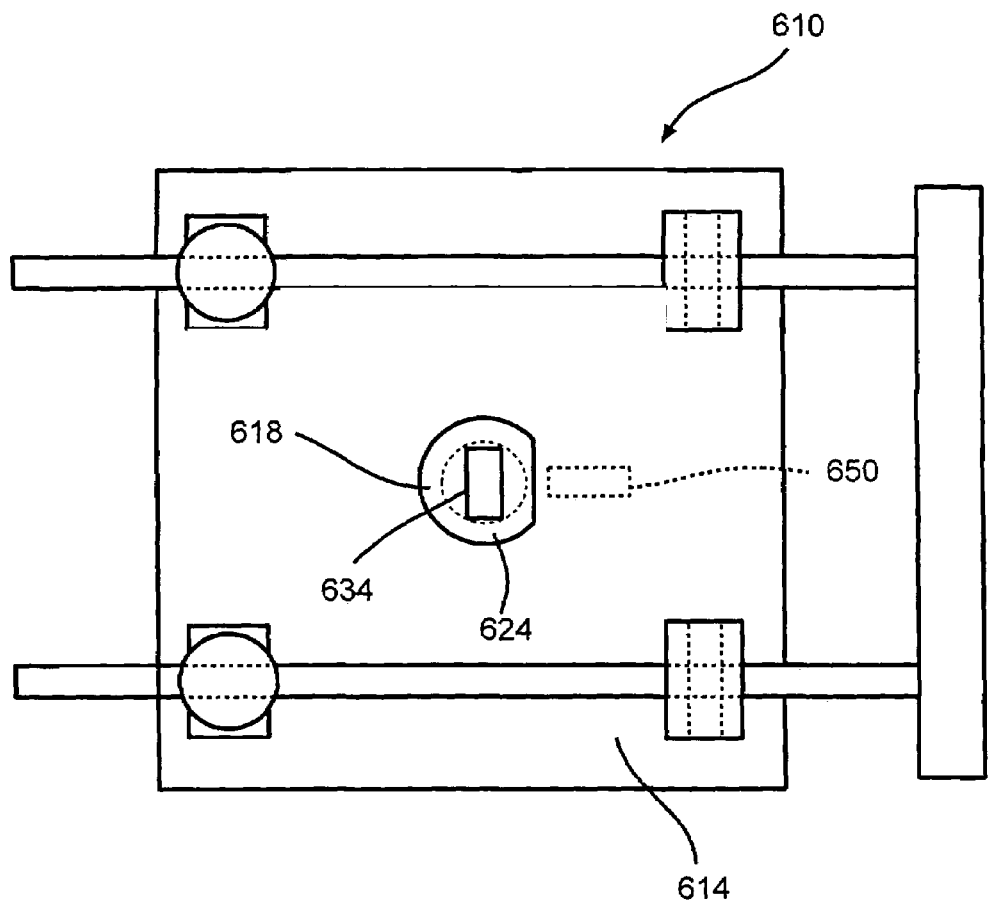
FIG. 6 is a top view of another embodiment of a coordination hole apparatus of the present invention.

FIG. 6. depicts an embodiment of a coordination hole apparatus 610 in which alternatively sized pin members 618 having variously sized slots 634 may be alternatively inserted and retracted out of the hole 624 in the base member 614 to accommodate differing sized holes in the parts being joined. The various sized pin members 618 are held in place utilizing a magnet 650 attached to the base member 614.

Figure 7:
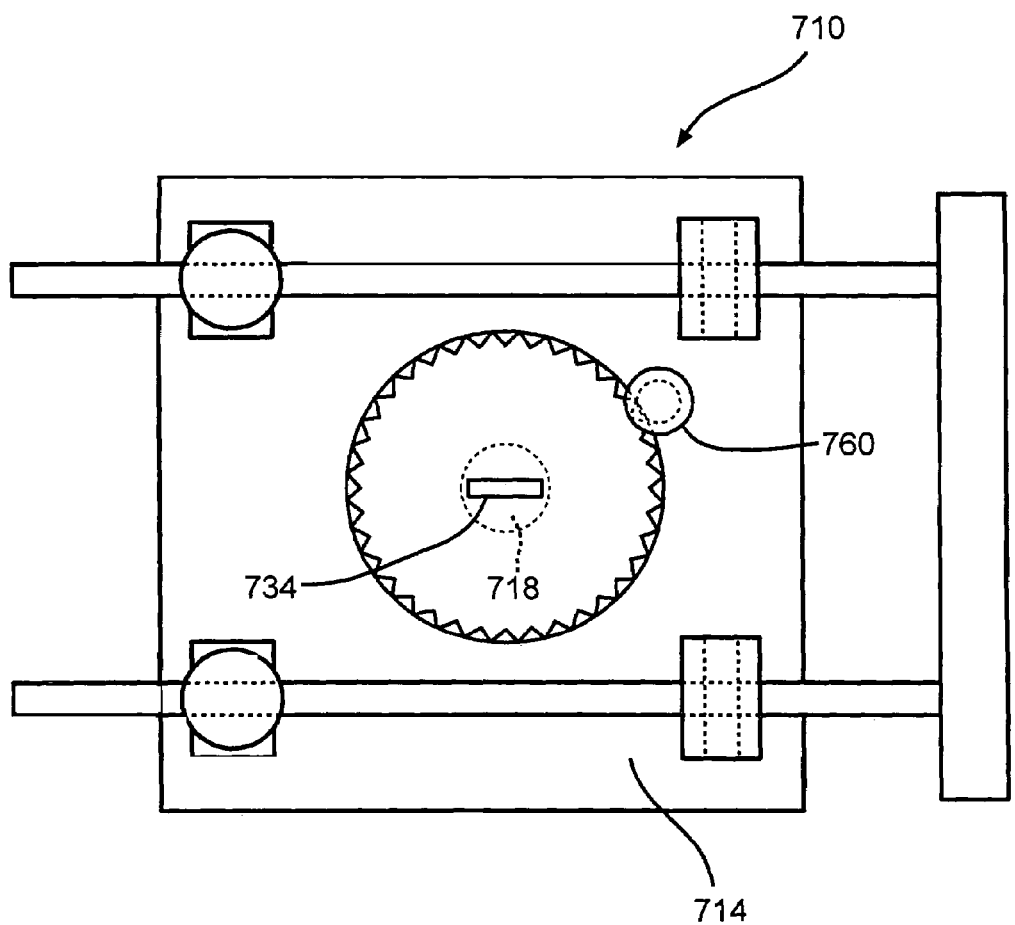
FIG. 7 is a top view of yet another embodiment of a coordination hole apparatus of the present invention.

FIG. 7. shows another embodiment of a coordination hole apparatus 710 in which the pin member 718 may be rotated to any desired angle to vary the orientation of the slot 734. The pin member 718 may be locked in place relative to the base member 714 utilizing a clamp 760.

Figure 8:
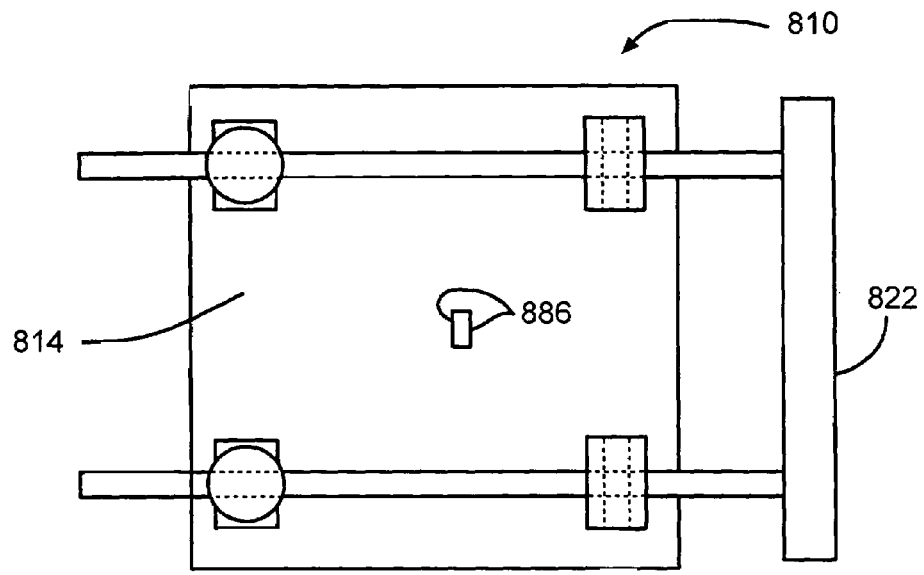
FIG. 8 is a top view of still another embodiment of a coordination hole apparatus of the present invention.
Figure 8A:
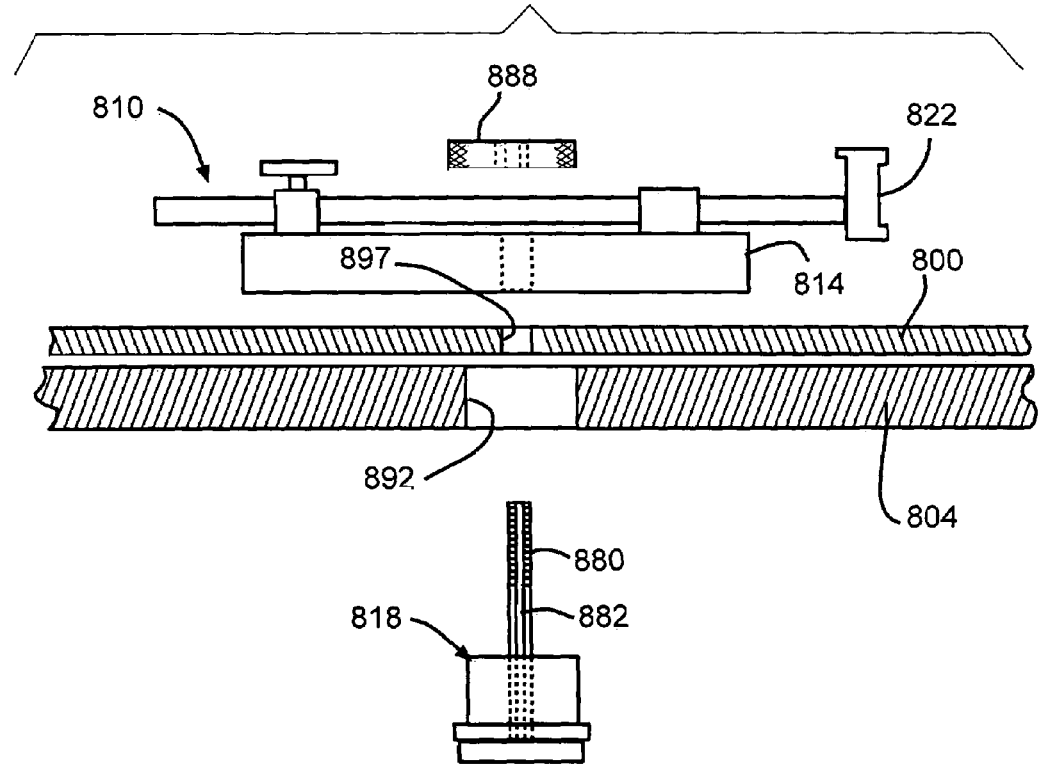
FIG. 8A is a partial cross-sectional side view of the apparatus of FIG. 8 being utilized to align two parts.
Figure 8B:
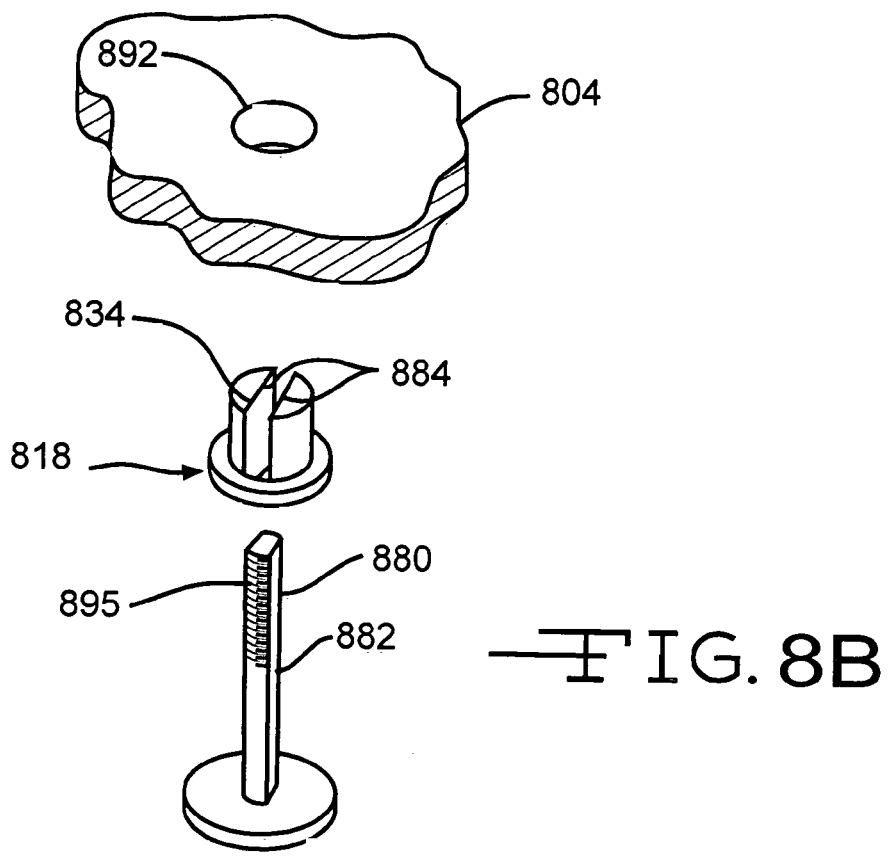
FIG. 8B is a perspective, partially unassembled view of the apparatus of FIG. 8 being utilized to align two parts.

FIGS. 8-8B depict an embodiment of a coordination hole apparatus 810 in which the slot 834 is in pin member 818. Another pin member 880 connects pin member 818 to base member 814 utilizing opposing flats 882 on pin member 880, opposing flats 884 on pin member 818, and opposing flats 886 on base member 814. As a result, the slot 834 is oriented relative to the index member 822. Threads 893 on nut 888 and threads 895 on pin member 880 can be used to temporarily fasten the parts 800 and 804 and applied tool 810.

This embodiment of the invention allows the smaller coordination hole 897 in part 800 to float along one direction relative to index member 822 to produce a temporary slot effect. Generic base members 814 may be utilized. The full or larger sized hole 892 is on the part 804 furthest away from the index member 822 and is particularly suitable for situations when it is advantageous to final drill from that side due to access or other restrictions.

Figure 9:
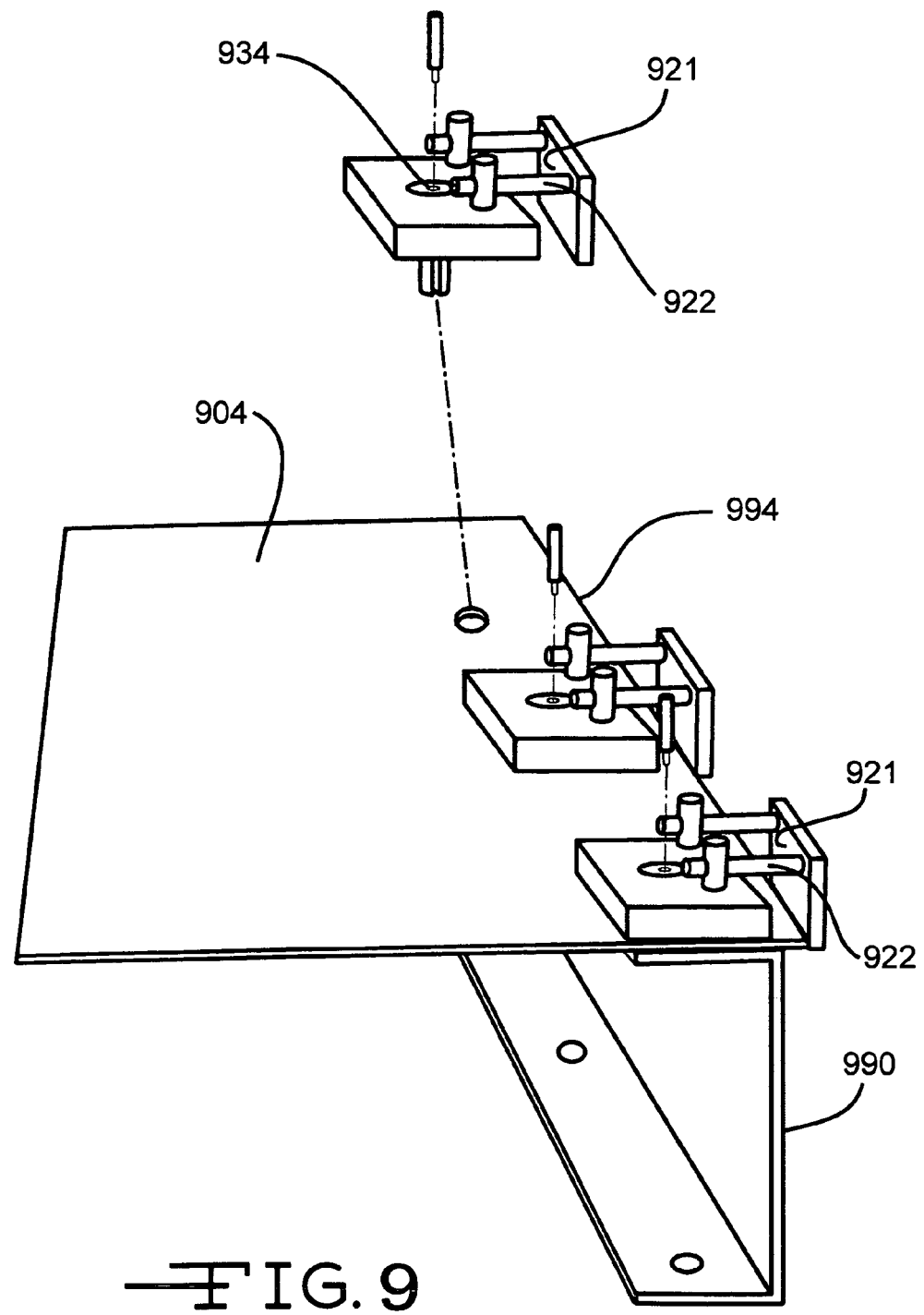
FIG. 9 is a perspective view of an airplane spar and skin being located using the apparatus from FIG. 1.

FIG. 9 is a perspective view of an airplane spar 990 and skin 904 being located using the apparatus of FIG. 1. Slot 934 may be oriented relative to an edge 994 of skin 904 by aligning surface 921 of index member 922 adjacent to skin edge 994. Utilizing this alignment, skin 904 and airplane spar 990 may be located substantially parallel to the skin edge 994.

The present invention may be used during the assembly of any type of parts, in aeronautical or non-aeronautical applications, to join the parts together while maintaining the critical dimension of the datum of the joined parts. In such manner, assembly of such parts may be less costly, less time-consuming, and more efficient.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that the appended claims, including all equivalents thereof, are intended to define the scope of the invention.

The invention claimed is:

1. A method of at least partially aligning a hole of one part with a hole of another part, the method comprising:
providing a first part having at least one first hole;
providing a second part having at least one second hole, wherein said first hole is larger than said second hole;
providing an apparatus including a base member, a pin member including a slot having a first length in one direction which is greater than a second length in a second direction, and an index member extending from said base member;
inserting at least a portion of said pin member in said first hole; and
aligning, at least partially, said slot with said second hole.

2. The method of claim 1 further comprising the step of fastening said first hole to said second hole.

3. The method of claim 1, wherein said first and second parts comprise airplane parts.

4. The method of claim 1, wherein said index member comprises a plate and at least one arm extending from said plate, said first part comprises an airplane stringer, said second part comprises an airplane wing, and said method further comprises the step of aligning a surface of said plate in a substantially parallel position against a surface of said airplane stringer.

5. The method of claim 1 wherein said step of providing an apparatus further comprises providing a locking member, and said method further includes the step of locking said base member in place relative to said index member utilizing said locking member.

6. The method of claim 1 further comprising the steps of removing said apparatus from its position with respect to said first and second parts, drilling at least one of said first and second holes to substantially eliminate the mismatch in hole size, and fastening said first hole to said second hole.

7. A method of at least partially aligning a hole of an airplane stringer with a hole of an airplane wing, the method comprising:
providing an airplane stringer having at least one first hole;
providing an airplane wing having at least one second hole, wherein said first hole is larger than said second hole;
providing an apparatus including a base member, a pin member including a slot having a first length in one direction which is greater than a second length in a second direction, and an index member extending from said base member, wherein said index member comprises a plate and at least one arm extending from said plate;
aligning a surface of said plate in a substantially parallel position against a surface of said airplane stringer;
inserting at least a portion of said pin member in said first hole;
aligning, at least partially, said slot with said second hole; and
fastening said first hole to said second hole.

8. The method of claim 7 wherein said step of providing an apparatus further comprises providing a locking member, and said method further includes the step of locking said base member in place relative to said index member utilizing said locking member.

9. The method of claim 7 further comprising the steps of removing said apparatus from its position with respect to said airplane stringer and said airplane wing, drilling at least one of said first and second holes to substantially eliminate the mismatch in hole size, and fastening said first hole to said second hole.

\* \* \* \* \*

UNITED STATES PATENT AND TRADEMARK OFFICE
CERTIFICATE OF CORRECTION

PATENT NO. : 7,578,044 B2  Page 1 of 1
APPLICATION NO. : 11/256134
DATED : August 25, 2009
INVENTOR(S) : Gregory L. Clark It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Seventh Day of September, 2010

David J. Kappos
*Director of the United States Patent and Trademark Office*